United States Patent [19]

Sado

[11] Patent Number: 4,611,995
[45] Date of Patent: Sep. 16, 1986

[54] ELECTRONIC LANGUAGE LEARNING MACHINE

[75] Inventor: Ichiro Sado, Tokyo, Japan

[73] Assignee: Canon Kabushiki Kaisha, Tokyo, Japan

[21] Appl. No.: 725,524

[22] Filed: Apr. 23, 1985

Related U.S. Application Data

[63] Continuation of Ser. No. 444,211, Nov. 24, 1982, abandoned, which is a continuation of Ser. No. 194,990, Oct. 8, 1980, abandoned.

[30] Foreign Application Priority Data

Oct. 16, 1979 [JP]  Japan ................................. 54-133943

[51] Int. Cl.⁴ ............................................. G09B 19/06
[52] U.S. Cl. ................................... 434/157; 434/169; 364/419
[58] Field of Search ........................ 434/156, 157, 169; 364/900 MS File, 200 MS File, 419; 400/109–111; 340/735, 753, 756, 790

[56] References Cited

U.S. PATENT DOCUMENTS

| | | | |
|---|---|---|---|
| 3,885,326 | 5/1975 | Robinson et al. | 434/170 |
| 4,124,843 | 11/1978 | Bramson et al. | 364/900 |
| 4,158,236 | 6/1979 | Levy | 434/156 |
| 4,159,536 | 6/1979 | Kehoe et al. | 364/900 |
| 4,218,760 | 8/1980 | Levy | 434/157 |
| 4,323,893 | 4/1982 | Ypsilantis et al. | 340/756 |

*Primary Examiner*—Richard C. Pinkham
*Assistant Examiner*—MaryAnn S. Lastova
*Attorney, Agent, or Firm*—Fitzpatrick, Cella, Harper & Scinto

[57] ABSTRACT

An electronic language learning machine is disclosed which comprises a memory having words stored therein, a sub-memory having sub-data relating to the words stored therein, a control circuit connected to the memory and sub-memory to derive the stored words and the related sub-data and a display connected to the deriving control circuit to visualize the words and sub-data.

9 Claims, 4 Drawing Figures

ELECTRONIC LANGUAGE LEARNING MACHINE

This application is a continuation of application Ser. No. 444,211 filed 11/24/82, now abandoned, which is a continuation of Ser. No. 194,990, filed Oct. 8, 1980, now abandoned.

BACKGROUND OF THE INVENTION

1. Field of the Invention

The present invention relates to a language learning machine and more particularly to an electronic language learning machine of the type in which words such as English words stored in a memory can be displayed in alphabetical letters by means of input keys.

2. Description of the Prior Art

Electronic machines for teaching or learning language are already known in the art. One example of such known electronic machines is an English language learning machine comprising a memory having a number of English words stored therein. Any of the stored words can be read out from the memory and displayed on a display part. However, additional information relating to the displayed word and useful for learning can not be displayed at all in the known language learning machine.

SUMMARY OF THE INVENTION

Accordingly, it is an object of the invention to provide a language learning machine which enables a person to learn a language more effectively than with the known machines.

It is another object of the invention to provide such language learning machine in which a larger number of words can be stored than can be stored in the known machines.

It is a further object of the invention to provide such language learning machine which is small in size and inexpensive as compared with the known machines.

Other and further objects, features and advantages of the invention will appear more fully from the following description taken in connection with the accompanying drawings.

DESCRIPTION OF THE PREFERRED EMBODIMENTS

Figure 1:
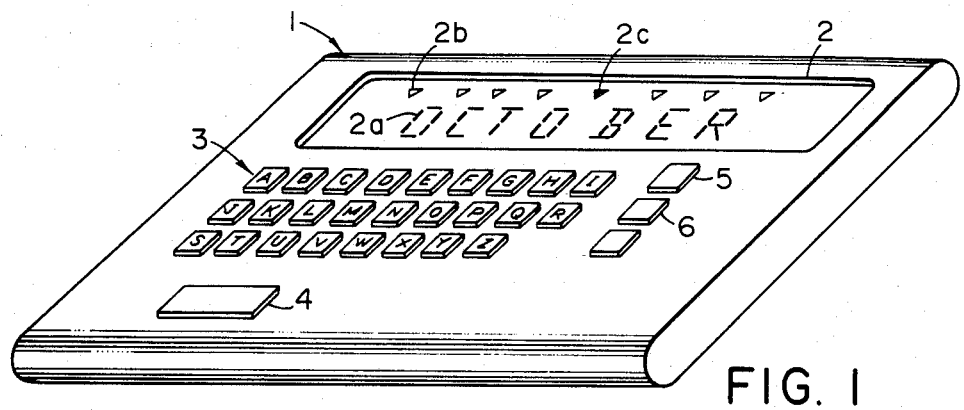
FIG. 1 is a schematic perspective view of a language learning machine showing an embodiment of the invention.
Figure 2:
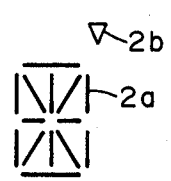
FIG. 2 is a plan view of one display unit comprising segments for use in the embodiment.

Referring first to FIG. 1 showing a language learning machine according to the invention, reference numeral 1 designates generally the body of the learning machine. A display part, that is, an indicator 2 is provided at the upper part of the body as viewed on the drawing of FIG. 1. At the part of the body 1 below the display part 2 there are arranged alphabet or letter input keys 3, a power source key 4, a translation key 5 and an accent indication key 6. The display part 2 comprises a plural number of display units, one unit per one display place. As shown in FIG. 2, each one display unit is composed of a 14-segment display element 2a and an accent indication mark 2b in a form of inverted triangle above the element 2a. A word is displayed on the display part 2 when the alphabet keys 3 are pushed down or when the translation key 5 is pushed down. In addition, by pushing down the accent indication key 6 the position of the accent for the displayed word is indicated by the accent mark 2b. In the example shown in FIG. 1 there is displayed a word "OCTOBER" on the display part 2 and an accent mark designated by 2c is lighted up. The accent mark 2c is on the upward right-hand side of the fourth letter "O" as counted from the left side and indicates that the word "OCTOBER" should be accented on said "O".

Figure 3:
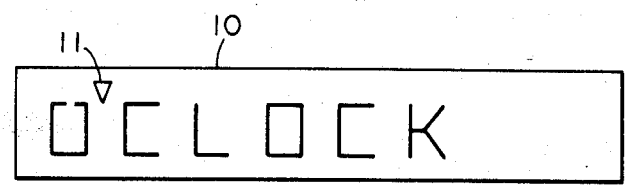
FIG. 3 shows another example of display on the language learning machine shown in FIG. 1.

FIG. 3 shows another example of display 10 on the display part 2. In this case, the word displayed is "OCLOCK" and an indication mark 11 following the leftward-most "O" is lighted on. This indication mark 11, in the shown case, is used to indicate not an accent but to represent an apostrophe. In this manner, according to the invention, the accent indication key can be used also to indicate an apostrophe, if any appears in the displayed word.

Figure 4:
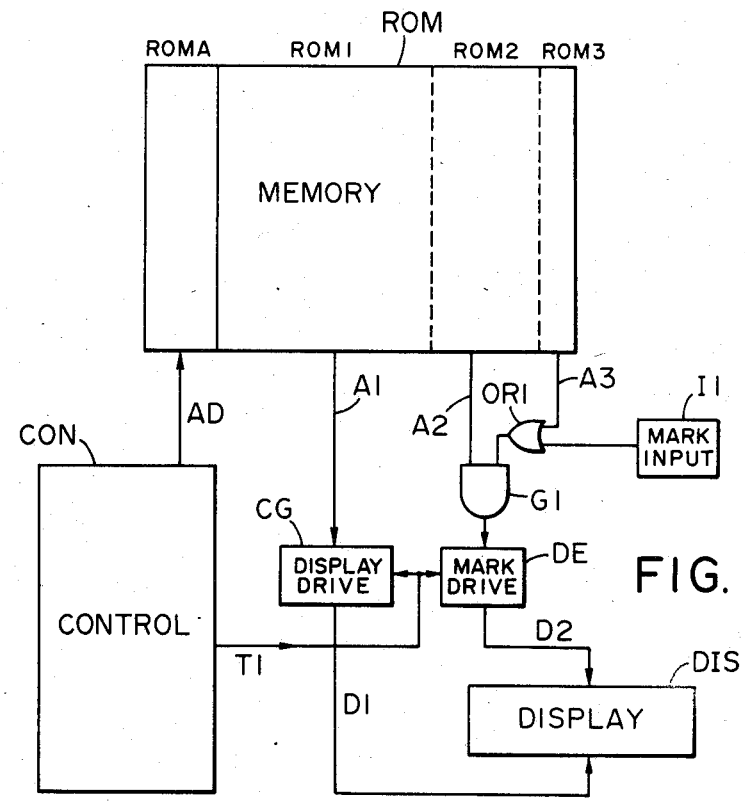
FIG. 4 is a block diagram showing the logical composition of the circuit used in the embodiment.

FIG. 4 is a block diagram of a logic circuit used in the above apparatus.

In FIG. 4, ROM is a read-only memory constituted of a address part ROM A, a data part ROM 1, a sub-data part ROM 2 and a discriminating data part ROM 3. ROM A stores the addresses of the read-only memory ROM. In ROM 1 there are stored binary coded data of spelling of words. In ROM 2 there are stored binary coded data of the position of accents as well as the position of apostrophes. Discriminating data part ROM 3 stores logic "1" when the code of the sub-data part ROM 2 is of apostrophe.

CON is a control part for controlling the system of the language learning machine. The control part CON includes an address counter for receiving inputs, generated by push-down of input keys 3, 5, 6, etc. and for applying instructions to the address part ROM A through signal line AD, and a circuit for generating a reference timing signal on a signal line T1. The content of data part ROM 1 is sent to a first display drive part CG through signal line A1 in accordance with the instruction applied to the address part ROM A from the control part CON through the signal line AD. Namely, the display drive part CG receives a content of ROM 1 corresponding to one address in ROM A addressed by the instruction from the control part CON. In the display drive part CG, the received content of the memory is converted into a signal for display through flip-flop, gates and matrix decoder (not shown) contained in CG. The converted signal is sent to the display device DIS to display it thereon. Data stored in the sub-data part ROM 2, that is, data indicative of the positions of accents and apostrophes are connected to one input of AND gate G1. Applied to the other input of G1 through an OR gate OR1 is a signal for discrimination between apostrophe and accent.

$I_1$ is a mark input part which generates an accent indication signal in accordance with the key 6. The output signal is applied to the other input of OR gate OR1. The output issued from AND gate G1 is applied to a mark drive circuit DE. When an apostrophe or an accent is to be indicated, the mark drive circuit DE makes the corresponding mark displayed on the display device DIS in response to the signal coming from the AND gate G1. The display drive circuit CG and the mark drive circuit DE are operated in synchronism with the timing signal T1 given by the control part CON.

In operation, at first the operator pushes down alphabet keys 3 to put a word into the machine. Alternatively, if the machine is an electronic translation machine, the operator makes an input of a word to be translated using the input keys 3 and then pushes down the translation key 5. By keying in this manner, the input data is applied to the control part CON and a corresponding address in the read-only memory ROM is selected through the signal line AD.

Data stored at the selected address in data part ROM 1 is read out and introduced into the display driver CG through the signal line A1. Then, in synchronism with timing signal T1 applied from the control part CON, the spelling of the selected word is displayed on the display device DIS (corresponding to the display part 2 in FIG. 1). Thus, the selected word, for example, "OCTOBER" is displayed on the display part of the machine as shown in FIG. 1. An accent indication signal of the selected word is applied to AND gate G1 through the signal line A2 in accordance with the information in the sub-data part ROM 2. On the other hand, since the selected word contains no apostrophe, there appears no signal at the output A3. Therefore, when the accent indication key I1 is pushed by the operator, AND gate G1 is made conductive and thereby the accent indication signal is transmitted to the mark drive circuit DE to display the accent on the display device DIS through the output D2 in synchronism with the timing signal T1. Thus, a mark (which is the mark 2c for the shown example in FIG. 1) lights on to indicate the position of the accent for the displayed word. The place at which the accent mark is to be lighted up is appointed by the corresponding code stored in the sub-data part ROM 2.

If the selected word contains an apostrophe as in the case of the example shown in FIG. 3, then a signal indicative of logic "1" is applied to OR gate OR1 from the discriminating data part ROM 3 through the signal line A3. As a result, the gate G1 is opened and therefore a code indicative of the position of display place at which the apostrophe mark is to be lighted on, is applied to the mark drive circuit DE from the sub-data part ROM 2. Thus, the mark drive circuit DE makes the apostrophe displayed at the determined position on the display part DIS through the signal line D2 (see FIG. 3).

In the above embodiment, the apostrophe is indicated on the display part independently of pushing the input key 6. However, a particular key may be provided for indication of apostrophe like the accent indication key 6.

In the above embodiment, only one AND gate G1 has been shown and used in the circuit. This is because the output from the sub-data part ROM 2 was considered to be read out serially on a time division basis. If it is wished to read out the information in parallel, this can be realized by adding an AND gate to each output of binary code from the sub-data part ROM 2. Generally speaking, the operator, if he is not a mere beginner, can distinguish accent indication from apostrophe indication at a glance to the display. Therefore, the discriminating data part ROM 3, key 11, gates OR1 and G1, etc. may be omitted from the above shown embodiment while modifying it in such manner that the output from ROM 2 can be applied directly to the mark drive circuit DE. By this modification, a further miniaturization and cost reduction of the language learning machine can be attained. In practice, there are many words which have a first accent and a second accent. Information on these accents will be provided easily by increasing the number of bits of the sub-data part ROM 2.

As readily understood from the foregoing, according to the invention, the language learning machine can display not only the spelling of a selected word but also additional data worthy of notice regarding the pronunciation of the selected word such as accent and apostrophe.

Such additional data are displayed employing a simple arrangement of marks according to the invention. Therefore, with the language learning machine according to the invention, a sufficiently high effect of learning can be attained without need of a large ROM. The language learning machine according to the invention is small in size and low in manufacturing cost.

While the invention has been particularly shown and described with reference to preferred embodiments thereof, it will be understood by those skilled in the art that the foregoing and other changes in form and details can be made therein without departing from the spirit and scope of the invention.

What I claim is:

1. An electronic language learning machine, comprising:
    means to translate a language,
    memory means for storing words of a language to be learned and associated marks, each mark representative of additional information relating to a different one of the words;
    display means for visualizing words and marks;
    selecting means for selecting any one of the words stored in said memory means to be displayed for study by a user of said language learning machine;
    applying means for applying a selected word to said display means; and
    manually actuatable means for causing said applying means to apply to said display means the mark associated with the selected word and stored in said memory means, after the beginning of the display of the selected word, where in response to actuation of said manually actuatable means said language learning machine accesses memory to provide location of where said mark should appear in relation to said selected word, as opposed to an operator inputting the location.

2. An electronic language learning machine according to claim 1, wherein said memory means stores each word and its associated mark in the same memory address.

3. An electronic language learning machine, comprising:
    means to translate a language,
    memory means for storing words of a language to be learned and associated marks, each mark representative of additional information relating to a different one of the words, each of the words and its associated mark being stored at a common address location in said memory means;
    display means for visualizing words and marks;
    selecting means for selecting any one of the words in said memory means;
    applying means for applying a selected word to said display means for display for study by a user of said language learning machine; and manually actuatable means for causing said applying means to apply to said display means the mark associated with the selected word and stored in said memory means, after the beginning of the display of the selected word, where in response to actuation of said manually actuatable means said language learning machine accesses memory to provide location of where said mark should appear in relation to said selected word, as opposed to an operator inputting the location.

4. An electronic language learning machine according to claim 3, wherein said display means includes a plurality of segmented display elements for displaying the words and a plurality of mark display elements for displaying the associated marks.

5. An electronic language learning machine according to claim 3, wherein said selecting means includes input means for entering information to select any one of said words.

6. An electronic language learning machine according to claim 5, wherein said manually actuable means is juxtaposed with said input means.

7. An electronic language learning machine, comprising:

means to translate a language, memory means having a first location, a second location and a third location, said first location for storing a word of a language to be learned, said second location for storing position information relating to a mark associated with the word, and said third location for storing information indicating the kind of mark;

display means for visualizing a word in the first location and its associated mark for study by a user of said language learning machine;

applying means for applying the stored word to said display means;

manual means for causing said applying means to apply to said display means the mark associated with the displayed word, wherein position of the mark is stored in said second location of said memory means; and where in response to said actuation of said manual means said language learning machine accesses memory to provide location of where said mark should appear in relation to said selected word, as opposed to an operator inputting the location;

means for receiving either the information in said third location or information from said manual means; and means for supplying position information of said second location in response to the received information for controlling the position in which the mark is displayed by said display means.

8. An electronic language learning machine according to claim 7, further comprising means for receiving one of the information in the third location and information from said manual means, and means for supplying position information of said second location in response to the received information.

9. An electronic language learning machine according to claim 7, further comprising input means for entering information to read out the language word stored in said memory means.

* * * * *